US012600472B2

(12) United States Patent
Horgan et al.

(10) Patent No.: US 12,600,472 B2
(45) Date of Patent: Apr. 14, 2026

(54) SEAPLANE WITH ATTACHABLE FLOAT FRAME COMPRISING AUXILIARY FUEL TANKS

(71) Applicant: Cub Crafters, Inc., Yakima, WA (US)

(72) Inventors: Patrick J. Horgan, Naches, WA (US);
Michelle R. Gates, Yakima, WA (US)

(73) Assignee: Cub Crafters, Inc., Yakima, WA (US)

( * ) Notice: Subject to any disclaimer, the term of this patent is extended or adjusted under 35 U.S.C. 154(b) by 0 days.

(21) Appl. No.: 18/668,198

(22) Filed: May 19, 2024

(65) Prior Publication Data

US 2025/0353591 A1     Nov. 20, 2025

(51) Int. Cl.
| | |
|---|---|
| *B64C 35/00* | (2006.01) |
| *B64C 25/10* | (2006.01) |
| *B64C 25/54* | (2006.01) |
| *B64C 25/66* | (2006.01) |
| *B64D 37/04* | (2006.01) |
| *B64D 37/26* | (2006.01) |
| *B64D 9/00* | (2006.01) |

(52) U.S. Cl.
CPC ............ *B64C 35/007* (2013.01); *B64C 25/10* (2013.01); *B64C 25/54* (2013.01); *B64C 25/66* (2013.01); *B64D 37/04* (2013.01); *B64D 37/26* (2013.01); *B64D 9/00* (2013.01)

(58) Field of Classification Search
CPC ....... B64C 35/00; B64C 35/008; B64C 25/54; B64C 25/66; B64C 25/52; B64D 37/00
See application file for complete search history.

(56) References Cited

U.S. PATENT DOCUMENTS

| | | | | | |
|---|---|---|---|---|---|
| 2,196,946 | A | * | 4/1940 | Stone | .................... B64C 35/008 244/101 |
| 4,777,738 | A | * | 10/1988 | Giese | ....................... A43B 5/08 D2/953 |
| 11,498,680 | B1 | * | 11/2022 | Montgomery | ........... B64D 9/00 |

(Continued)

OTHER PUBLICATIONS

Brown, S-660-R Adhesive Backed Non Skid Wing Walk 6"×60'. (2020). https://www.brownaircraft.com/S-660-R-Adhesive Non-Skid-Wing-Walk-6inx60ft-p/s-660-r.htm. (Year: 2020).*

(Continued)

*Primary Examiner* — Ashesh Dangol
(74) *Attorney, Agent, or Firm* — Christensen O'Connor Johnson Kindness PLLC

(57) ABSTRACT

A seaplane float frame apparatus with extra fuel storage, and a method of installing, comprising: 1) a middle section housing at least one auxiliary fuel storage tank; and 2) two opposing side panels affixed to the middle section, extending outward from about 45-60-degrees from the parallel, each of the two opposing side panels comprising a bottom flat edge fit-able to a float (e.g., carbon composite). The middle section further comprises a fuel pump and a fuel line attached to the auxiliary fuel storage tank(s) and to a main fuel tank within an airplane fuselage-engine. Electrical components enable the pilot, or automatedly as needed, to pump fuel from the frame's tanks. The two opposing side panels comprise triangular shaped cutouts to reduce the float frame's weight and drag, and a built-in steps, a bar, and non-skid coating on the floats to assist in climbing safely into/out of the cockpit.

20 Claims, 11 Drawing Sheets

(56) References Cited

U.S. PATENT DOCUMENTS

| | | | | |
|---|---|---|---|---|
| 2008/0272237 A1* | 11/2008 | Tichborne | ................. | G01F 9/00 |
| | | | | 73/290 R |
| 2010/0044506 A1* | 2/2010 | Smith | .................... | B64C 25/10 |
| | | | | 244/101 |
| 2019/0016448 A1* | 1/2019 | Robertson | ............... | B64C 35/00 |
| 2019/0168873 A1* | 6/2019 | Wiplinger | ............. | B64D 37/16 |
| 2019/0248479 A1* | 8/2019 | Smith | ....................... | B64F 5/00 |
| 2022/0258860 A1* | 8/2022 | Lueck | .................. | B64C 35/006 |

OTHER PUBLICATIONS

Ecoglo. F5B-N20 Non-Slip Flat Stair Nosing. (2020) https://ecoglo.
us/products/non-slip-step-edge-markings/flat-stair-nosings/f5b-n20/.
(Year: 2020).*

* cited by examiner 174                    172                    174

170

SEAPLANE WITH ATTACHABLE FLOAT FRAME COMPRISING AUXILIARY FUEL TANKS

FIELD OF THE INVENTION

The technical field of the present invention relates to seaplanes, and in particular to frames attachable to the underside of an airplane to convert it into a seaplane. The frame comprises at least one auxiliary fuel tank and a means of attaching a pair of floats to the frame bottom to enable the airplane to take off and land on water.

BACKGROUND OF THE INVENTION

Seaplanes generally comprise a modified landplane that comprises two pontoons, or floats, in lieu of the standard wheels of landplanes. A frame comprising triangular bars attaches the fuselage to the floats. Seaplanes have either straight floats that have no wheels and cannot operate on land; or amphibian floats that have retractable wheels and are operatable on land and in the water.

Seaplanes are often used to fly people and cargo to remote geographical areas where travel by automobiles is difficult and airports are nonexistent. Straight and amphibian seaplanes land and takeoff on water, preferably calm water (e.g. a lake), which requires a longer takeoff distance than a concrete runway. It is particularly important then for seaplanes to have maximum fuel efficiency and fuel storage.

Unfortunately, seaplanes and their float designs have numerous disadvantages, e.g.: drag from exterior bracing and control wires; requirement of an increased takeoff distance; a reduced maximum takeoff weight because of the added weight of the floats; can take-on water from takeoff/landings that needs to be pumped out of the floats; and require a thick float skin to prevent stress fracture, which increases seaplane weight and thus fuel consumption.

What is needed with the seaplane industry is a float system that maximizes fuel efficiency and fuel storage by reducing drag and weight of the floats and the float frame; and by increasing the fuel storage capacity. The float system should be able to be easily fitted to an existing airplane (e.g. by removing the landing gear and replacing it with the float frame/system).

SUMMARY OF THE INVENTION

Various embodiments of the present invention comprise: a "float frame" apparatus with at least one internal auxiliary fuel storage tank, and a fuel pump to transfer the auxiliary fuel to the main fuel tank or directly to the engine. The auxiliary fuel storage can store from 20-40 gallons of airplane fuel. The exact amount is dependent on the size of the float frame that fits beneath a seaplane fuselage.

In one embodiment, the float frame comprises a middle section, and two opposing side sections attached to the middle section. The float frame id substantially "saddle" shaped, with the following components: 1) a substantially flat middle section housing the one or more (e.g. two) internal auxiliary fuel tank(s), fuel pump, and fuel lines; and 2) two opposing side panels attached to the side of the middle section, and with cutouts (e.g. triangular, oval, circular, square, rectangular, etc.) to reduce the drag and weight of the saddle. The two opposing side panels extend from the flat middle section downward and outward at about a 45-60-degree angle from the parallel.

In another embodiment, the seaplane float frame apparatus comprises: a) a substantially flat rectangular middle section comprising at least one rectangular auxiliary fuel storage tank; b) two opposing side panels affixed to the flat rectangular middle section, extending outward at about 45-60-degrees from the parallel, each of the two opposing side panels comprising a bottom flat edge fixable to a seaplane float; and c) wherein the float frame is able to be affixed to the underside of an airplane fuselage to enable the airplane to land and takeoff on water, and to provide additional fuel in flight.

In an embodiment, the two opposing side panels further comprise substantially flat bottom surfaces with mechanisms to easily attach the float frame to a pair of floats.

In an embodiment, the float frame further comprises a built-in ladder and/or hand holds to assist the passengers/pilot to climb up the float frame and into the cockpit.

The seaplane float frame apparatus middle section comprises a substantially saddle shape that is curved downward/inward; and in one embodiment with a flat top surface, or in another exemplified embodiment, with a curved front side and a straight back side. In an embodiment, the two opposing side panels each comprise one or more cutouts to reduce a weight and a drag of the float frame, wherein the cutouts comprise two right triangles, with hypothenuses sides facing.

The saddle the middle section further comprises a fuel pump, a fuel line, and a vent line attached to the least one auxiliary fuel storage tank, able to pump fuel to a main fuel tank, and/or attached directly to an engine within an airplane fuselage. The middle section further comprises electrical/mechanical components to enable the pilot to activate the pumping of fuel from the auxiliary fuel tank. In another embodiment, the middle section further comprises electrical/mechanical components to automatedly pump fuel from the auxiliary fuel tank when the main tank reaches a minimum level of fuel.

The saddle middle section further comprises an adapter comprising bolts to securely attach the top of a float frame to an airplane fuselage; and the saddle bottom flat edge on each of the two opposing side panels comprises mechanisms to securely attach a float to each of the two opposing side panels.

Float System

In an embodiment, the various embodiments of the present invention comprise a "float system" comprising the float frame and a pair of attached floats. The shape, buoyancy, weight, etc. of the float pair is largely dependent upon the seaplane. The floats are made of a carbon composite, in one embodiment, to increase buoyancy while reducing the float weight. The pair of floats further comprise a retractable or a fixed wheel set comprising: a nose wheel, and a main wheel. In another embodiment, the floats do not comprise wheels.

In an embodiment, each of the pair of floats are coated with a non-skid pattern material on at least a float deck top surface to prevent a user from slipping while walking on the float. The "non-skid" material, in an embodiment, comprises a printed pattern or texture on the top surface to that is non-slip/non-skid. In an embodiment, the "non-skid" material comprises a pattern of intertwined curves that are made by molding the composite material.

The present invention further comprises a method of installing a seaplane float frame apparatus of the present invention on an airplane, comprising the steps of: 1) providing a seaplane float frame apparatus as disclosed herein with a middle section with at least one auxiliary fuel storage tank and two opposing side panels; 2) affixing the float frame middle section to the underside of an airplane fuselage; and 3) affixing a float to a bottom flat edge on each of the two opposing side panels of the float frame. In an embodiment, the seaplane normal landing gear is removed before affixing the middle section to the airplane fuselage. In an embodiment, the method of installing further comprises connecting the at least one auxiliary fuel storage tank directly to the engine and/or to the main fuel tank.

In an embodiment, the float frame replaces the landing gear that comprises fixed wheels to land on hard surfaces, so the seaplane is only able to take-off and land on water. In another embodiment, the float frame comprises integrated and retractable landing gear and/or emergency landing gear, which in an embodiment are stored in wheel wells inside the float structure.

In an embodiment, the floats comprise a retractable front nose wheel and a retractable back main wheel on each float for the seaplane to be able to land and take-off on both water and land.

The float frame can easily be fitted to an existing airplane to convert it into a seaplane.

In an embodiment, the pair of floats and the float frame apparatus comprise a carbon composite, which is light weight to conserve fuel consumption.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1A:
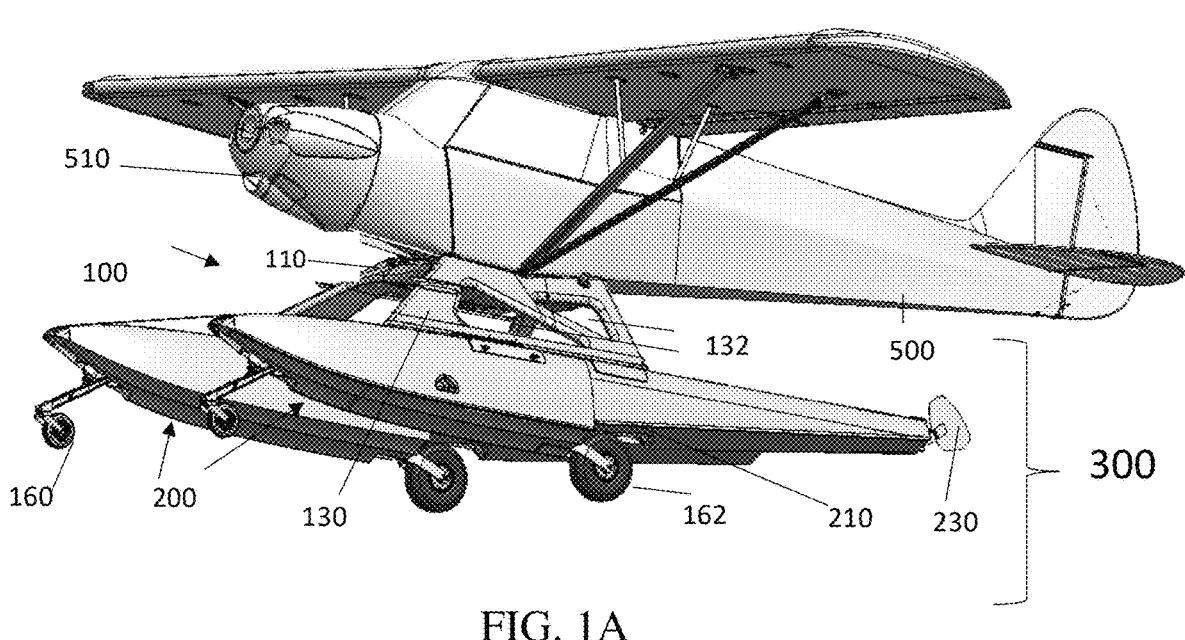
FIG. 1A is a bottom perspective view of an exemplary seaplane with the present invention's float frame comprising auxiliary fuel storage tanks, and a pair of floats with retractable wheels attached to the float frame bottom.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

Figure 1B:
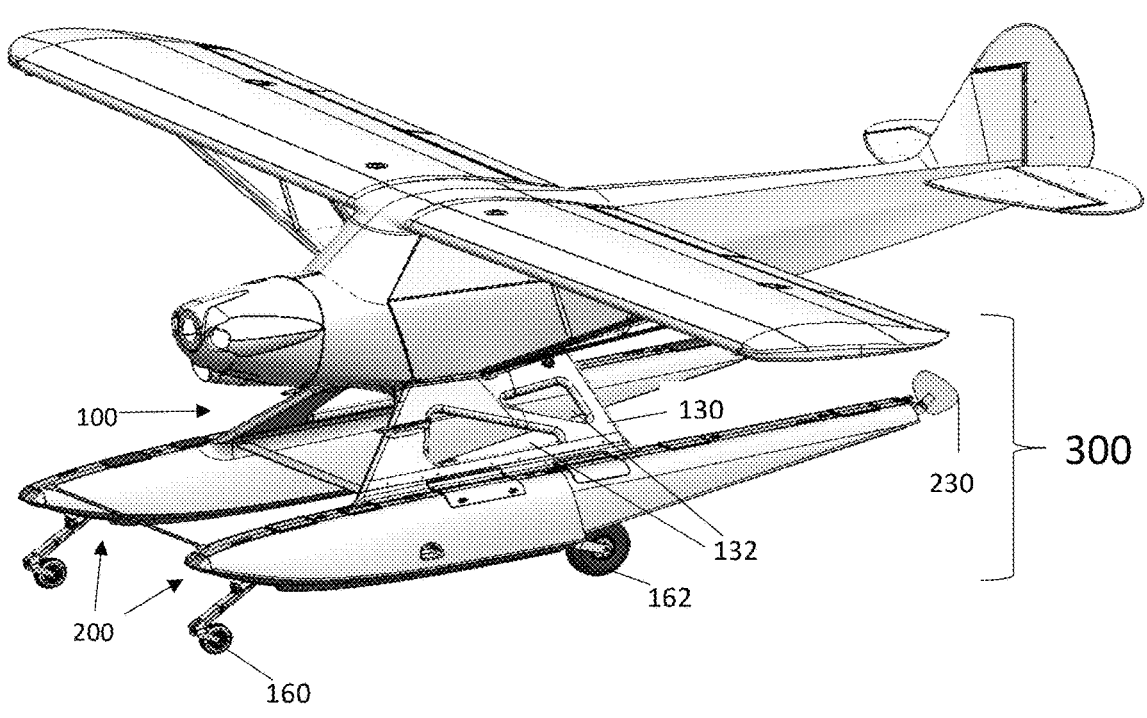
FIG. 1B is a top perspective view of the seaplane of FIG. 1A.

FIGS. 1A-1B illustrate a seaplane with the float system 300 of the present invention in one embodiment comprising a float frame 100 attached to a pair of floats 200, which have retractable wheels (front small 160, back main 162). In another embodiment, floats 200 do not comprise wheels, and can thus only land and take-off on water (e.g. see FIG. 1C).

Figure 2:
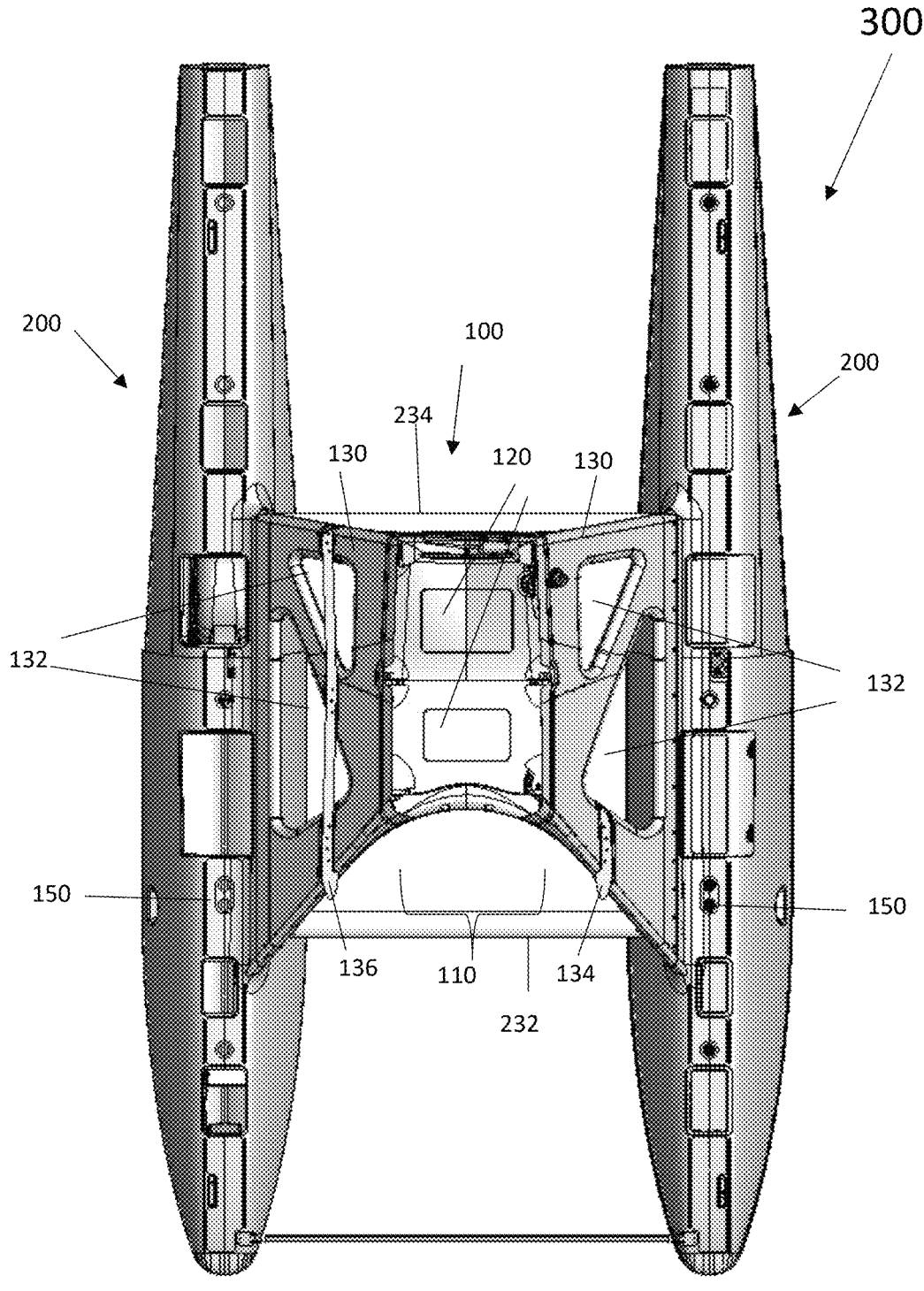
FIG. 2 is a top plan view showing the float frame with floats attached.
Figure 3A:
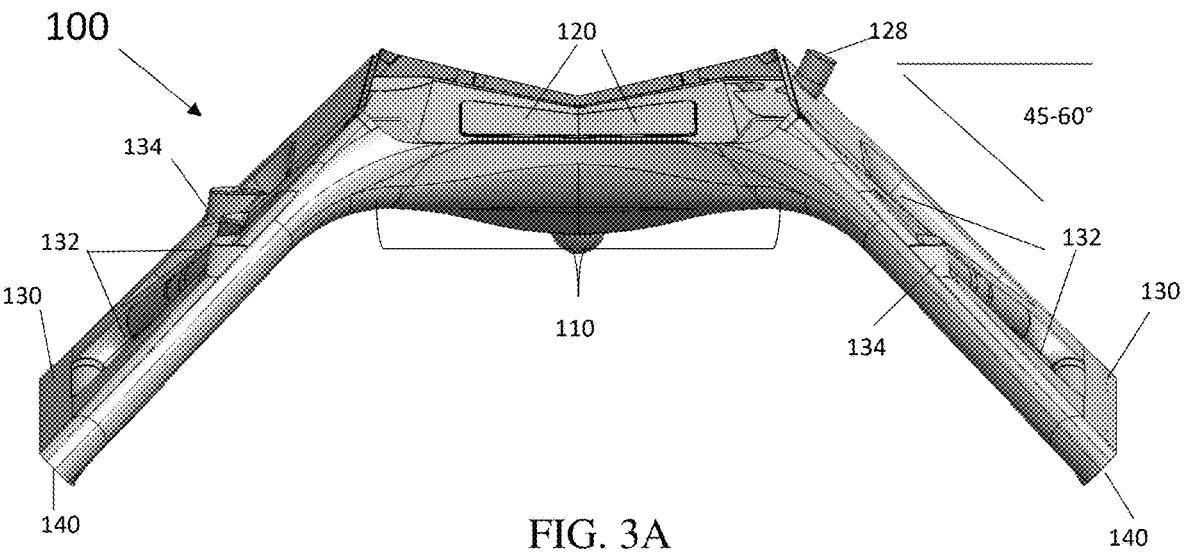
FIG. 3A is a front plan view of the float frame illustrating the exemplified substantially flat middle section housing the two auxiliary fuel storage tanks, and the two opposing side panels that extend outward at about 45-60-degrees to the parallel.
Figure 3B:
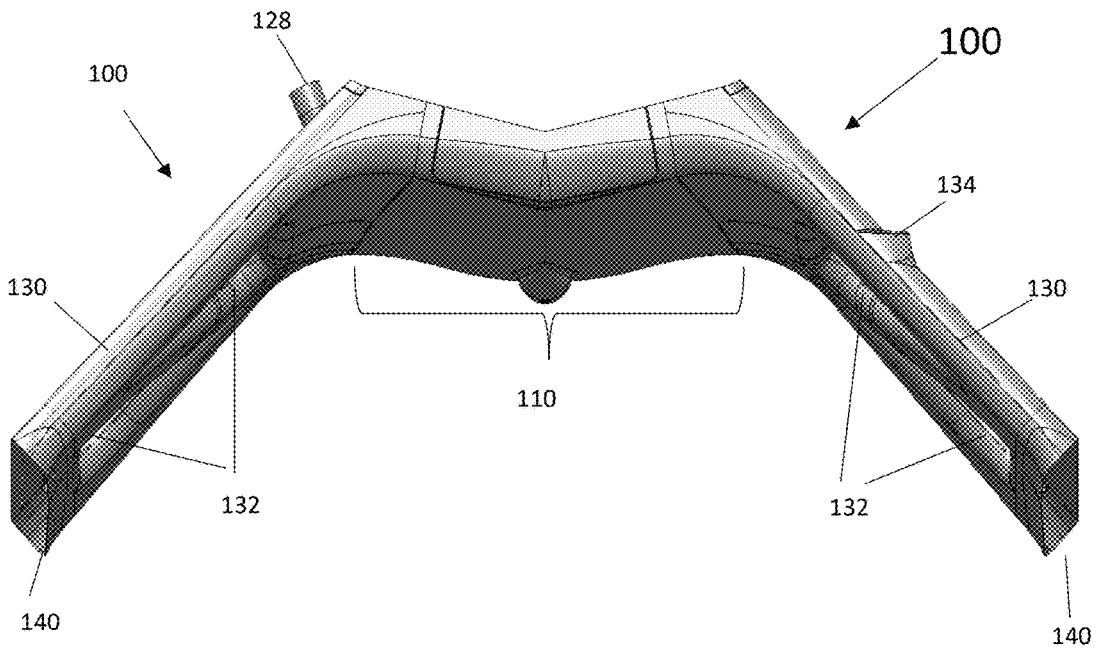
FIG. 3B is a rear plan view of the float frame of FIG. 3A.
Figure 3C:
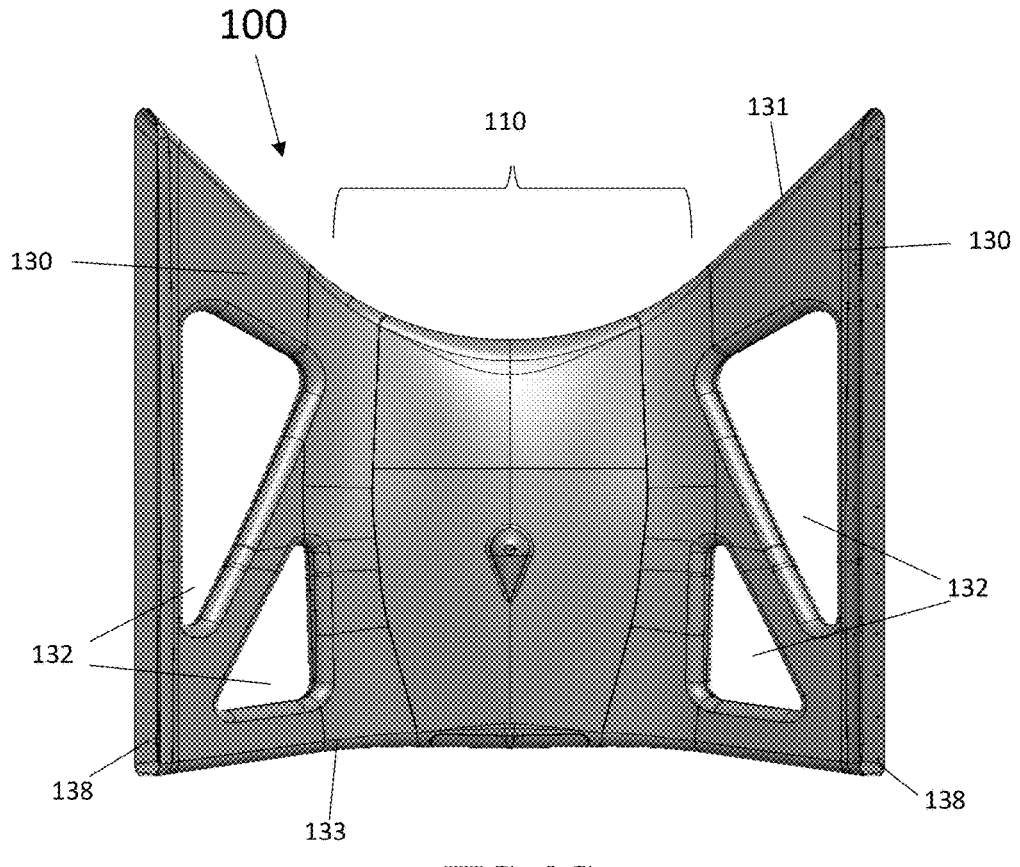
FIG. 3C is a bottom plan view of the underside of the float frame without the floats attached, which is otherwise referred to herein as the "saddle".
Figure 3D:
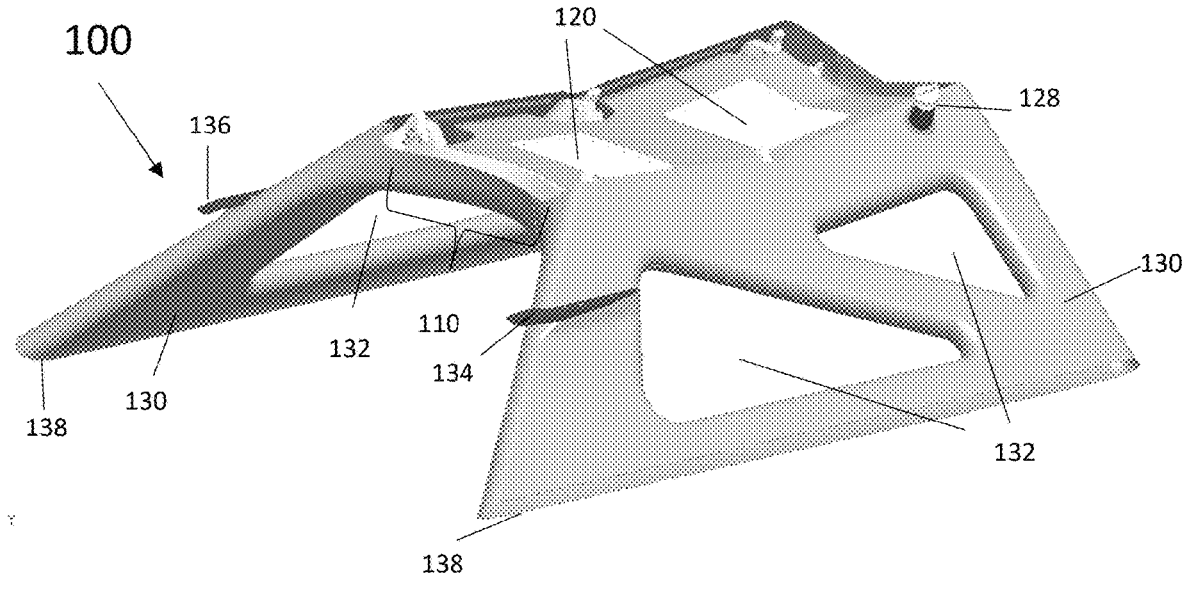
FIG. 3D is a side perspective view illustrating the side ladder and side hand holds to assist passengers from climbing in/out of the cockpit.
Figure 4A:
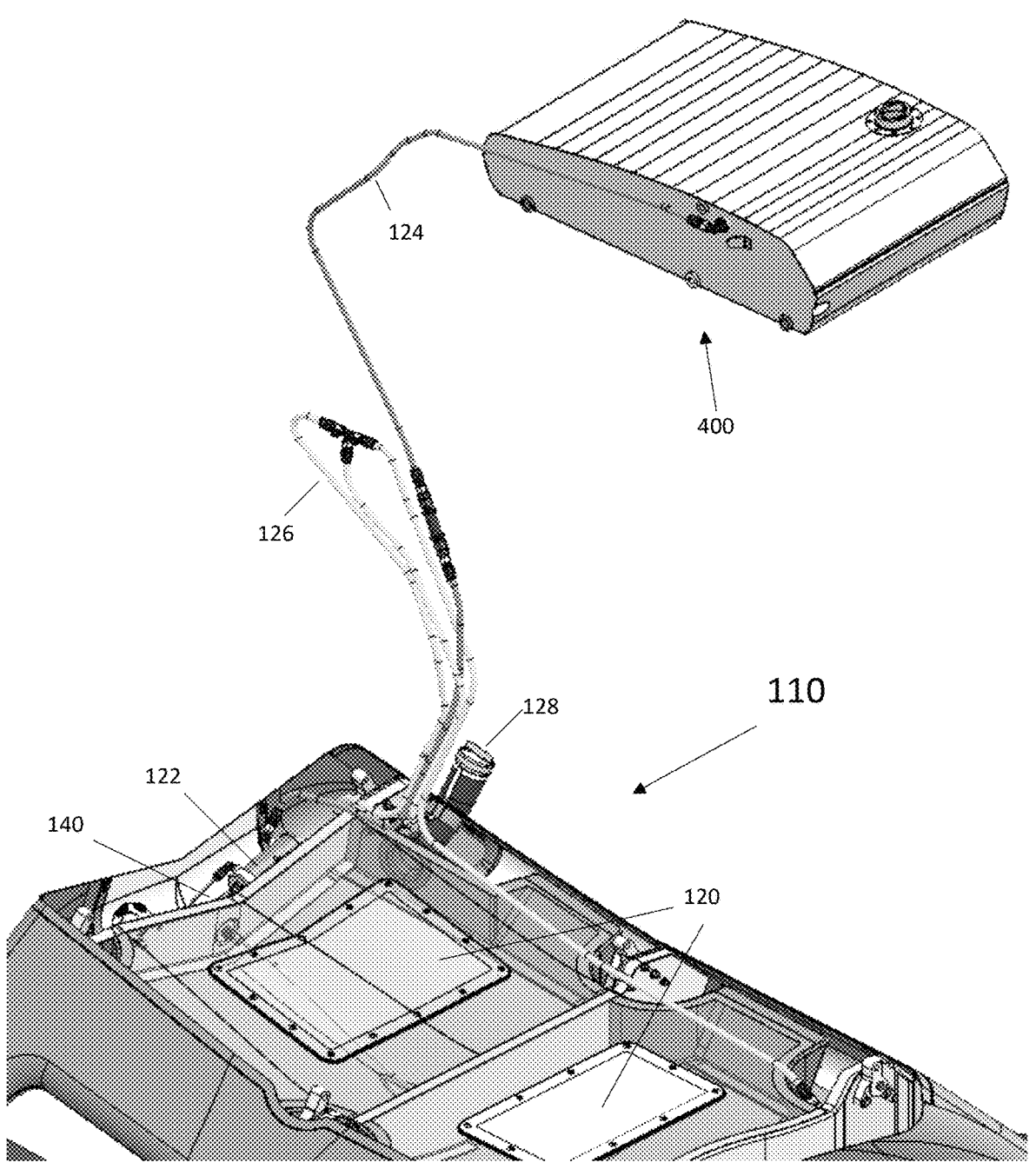
FIG. 4A is a top front perspective view of the fuel supply system within the float frame, comprising: the fuel line connecting the main fuel tank (upper right) to the auxiliary fuel tanks within the float frame; the fuel pump to move the fuel from the auxiliary tanks to the main tanks (or to the engines); and the vent lines to release air or excess fuel.
Figure 4B:
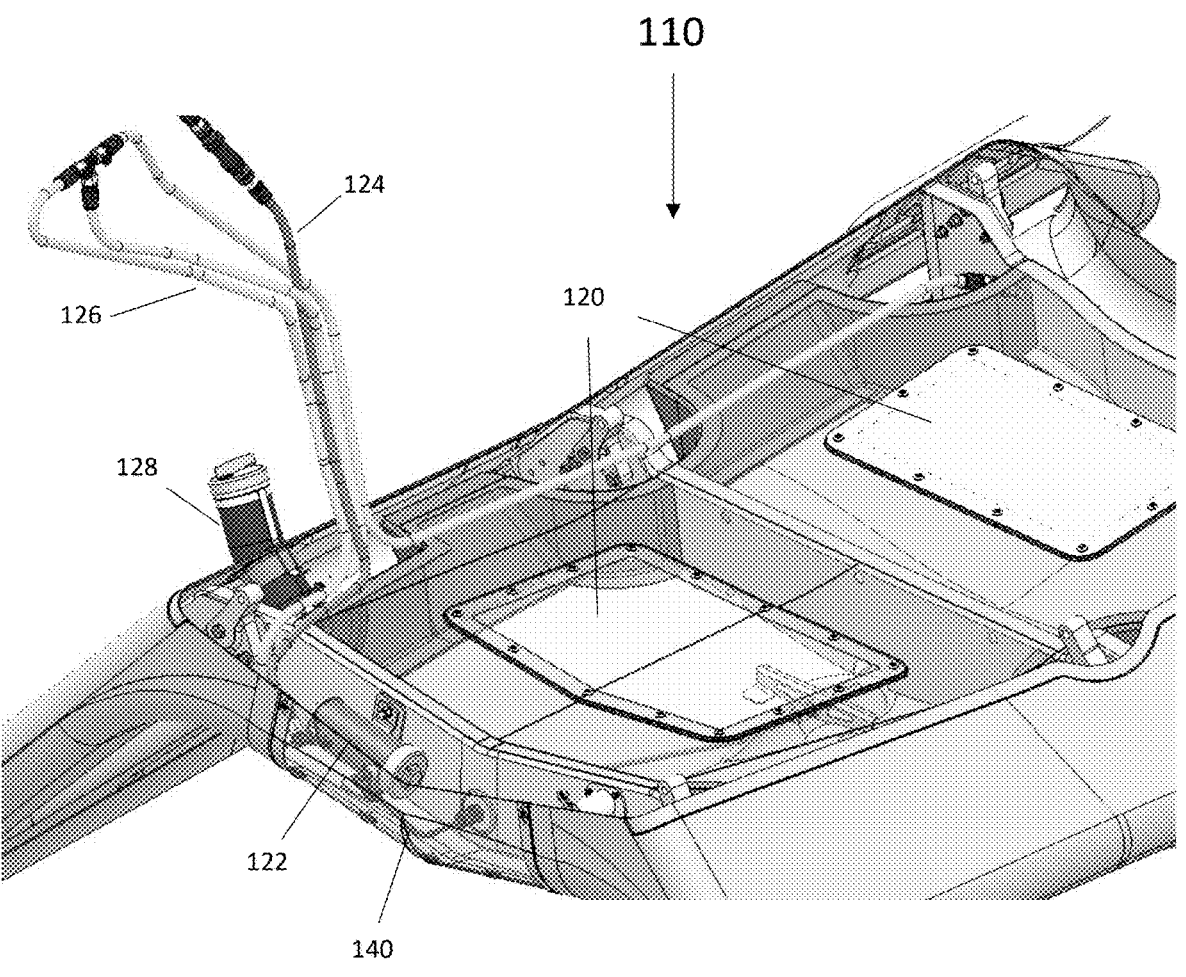
FIG. 4B is a top rear perspective view showing the fuel pump system of FIG. 4A.
Figure 5:
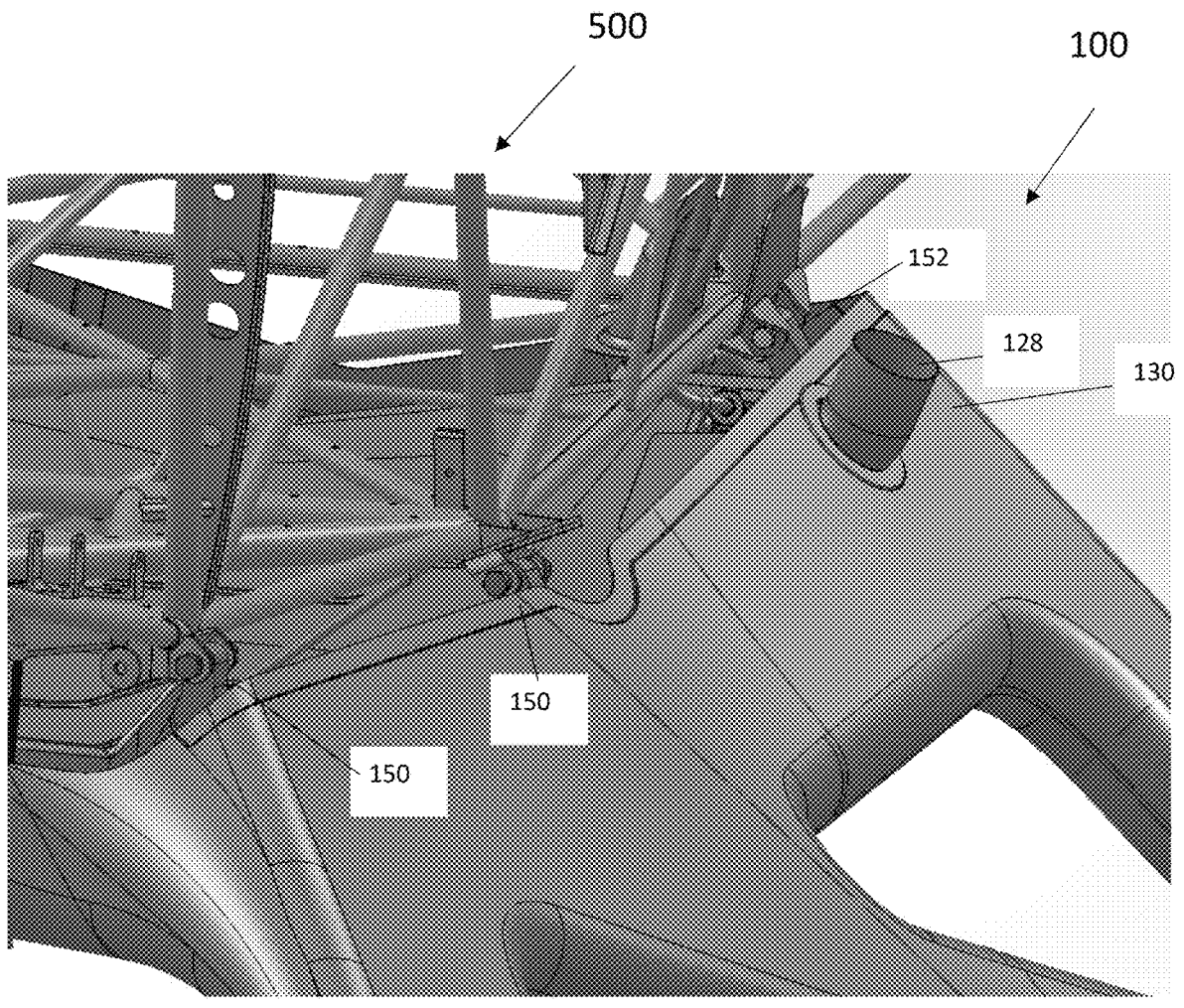
FIG. 5 is an exemplary view of a mechanism to attach the airplane fuselage (bars) to the float frame via bolts.
Figure 6A:
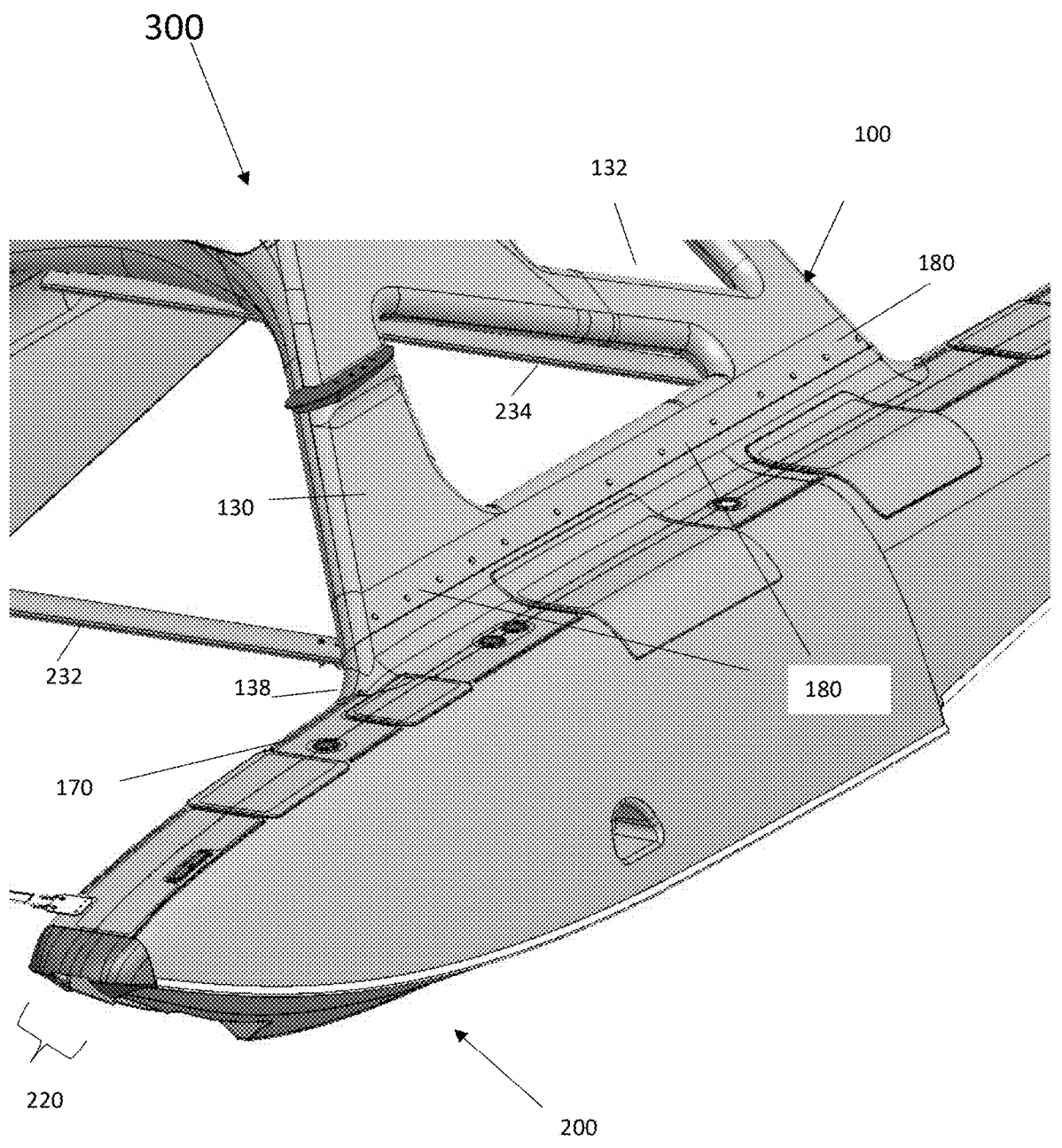
FIG. 6A is a perspective view of the mechanism/blots for attaching the frame side panels to the floats.
Figure 6B:
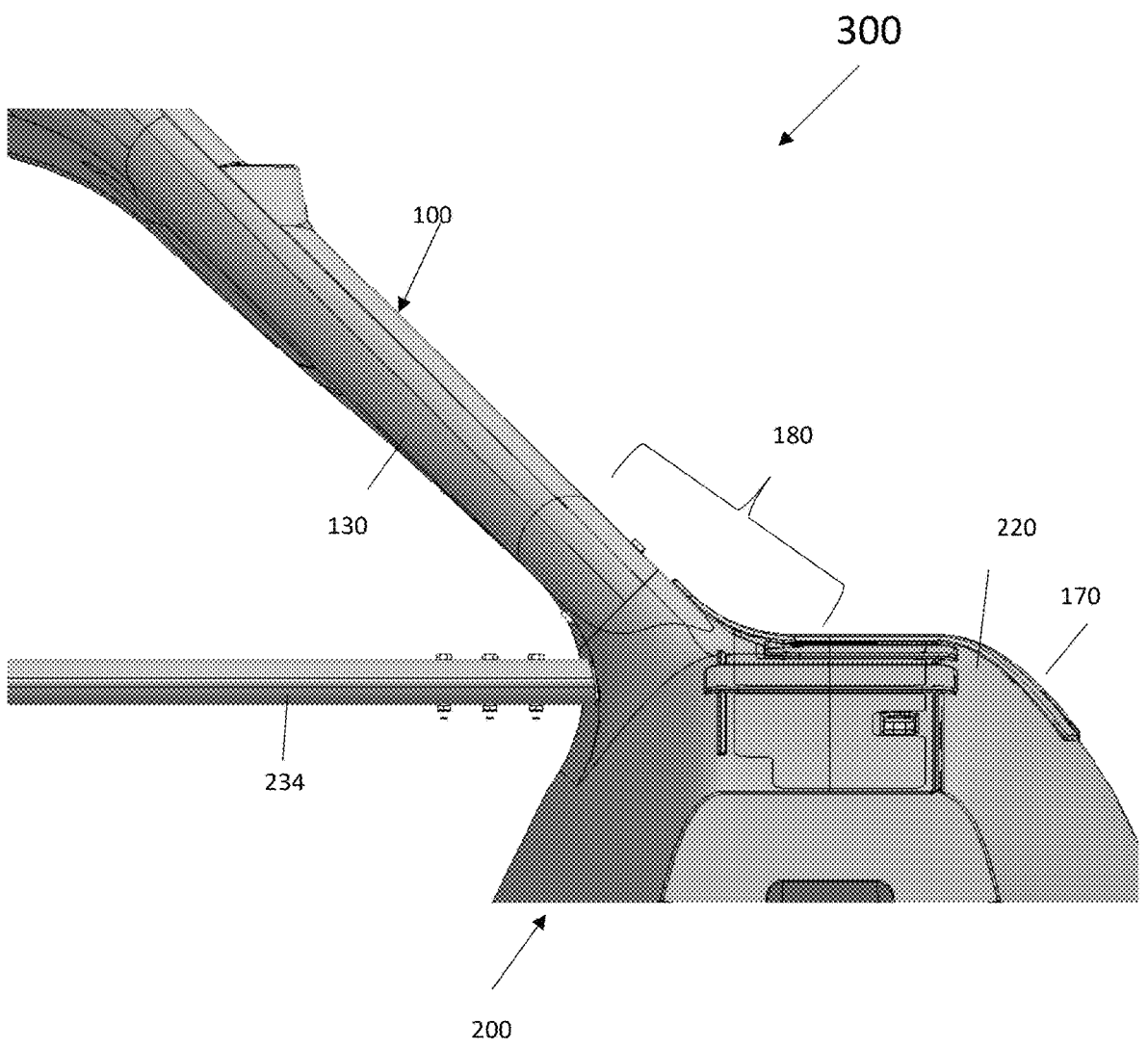
FIG. 6B is a front view of FIG. 6A.

In summary, FIG. 2 is a top plan view of the float system 300, illustrating that the floats 200 may be securely connected together by front bar 232 and/or back bar 234 extending perpendicularly between the two floats 200. FIGS. 3A-3D illustrate an exemplary embodiment of the float frame 100 without bar 234; FIGS. 4A, 4B illustrate the float frame's auxiliary fuel tanks 120 connected to the main tank 400; FIG. 4B illustrates the additional components needed to pump fuel (automatedly as needed when fuel is low in the main tank, or via an actuator activated by the pilot from the cockpit). Additionally, FIG. 5 illustrates an exemplary mechanism for securely affixing float frame 100 to the underside of a seaplane fuselage 500; and FIG. 6A, 6B illustrate a mechanism for securely affixing a float 200 to the bottom or underside of float frame 100.

Seaplane Float Frame Apparatus

FIGS. 3A-3D are various views of the float frame 100 illustrating the substantial "saddle" shape of a middle section 110 with right and left sides connected to two opposing side panels 130, and an exemplary pair of auxiliary fuel tanks 120 in the middle section 110. Alternative embodiments comprise one or more auxiliary fuel tanks 120; and or the middle section 110 being substantially flat. In the exemplified embodiment shown in FIGS. 3A-3D, the front side 131 of the float frame 100 is curved, while the back side 133 is straighter (e.g., see FIGS. 2, 3C). Additionally, the two opposing side panels 130 are at about 45-60-degrees angle from the line parallel to ground (e.g., see FIG. 3A).

In an exemplary embodiment, middle section 110 is substantially rectangular shaped (although other shapes are envisioned—e.g. square, trapezoid, etc.) with at least one auxiliary fuel tank (e.g. a pair of auxiliary fuel tanks 120 of the same or a different size) that store from about 20-40 gallons of airplane fuel. An alternative number of auxiliary fuel tanks 120 are also envisioned (at least one, two, etc.). The exact number of auxiliary fuel tanks and their fuel storage capacity is largely dependent on the size of the float frame that fits beneath a seaplane fuselage.

FIGS. 4A, 4B illustrate exemplary electrical/mechanical components attached to the auxiliary fuel tanks 120, e.g.: fuel pump 122; electrical wires/switches/actuator 140; outer refill unit 128 to add fuel manually; etc., to assist in pumping fuel from the auxiliary fuel tanks 120 to the main fuel tank 400 or directly to the engine (FIG. 1A, 510), using fuel line 124. Vent line 126 is used to emit air and/or excess fuel from the fuel tank 120. In an exemplary embodiment, fuel pump 122 comprises: the Facet 40131E™ fuel pump that possesses 4.0-5.5 psi, at 34 GPH.

The fuel is pumped automatedly as needed (e.g. when the fuel gage reaches a warning level) or under control of the pilot using controls/switches well known in the art from the cockpit that are connected wired/wirelessly with the pump 122.

As further illustrated in FIGS. 1A-3D, the two opposing side panels 130 each comprise one or more cutouts 132 to reduce the weight and drag of the float frame 100. The figures illustrate one exemplary embodiment of two right triangular shaped cutouts 132 of different sizes with the hypothenuses sides facing, but other shapes, numbers, and size of cutouts are envisioned within the scope of the present invention (e.g., square, circular, oval, rectangular, trapezoidal, etc.).

In an embodiment, the two opposing side panels 130 further comprise at least one built-in step 134 on one side (e.g. see FIGS. 3A, 3D on both or one sides), and/or a mid-positioned horizontal bar 136 on the other side (e.g. see FIG. 2). Both assists 134, 136 can be on one or both sides of float frame 100 to aid a user stepping into and out of the cockpit.

Figure 7:
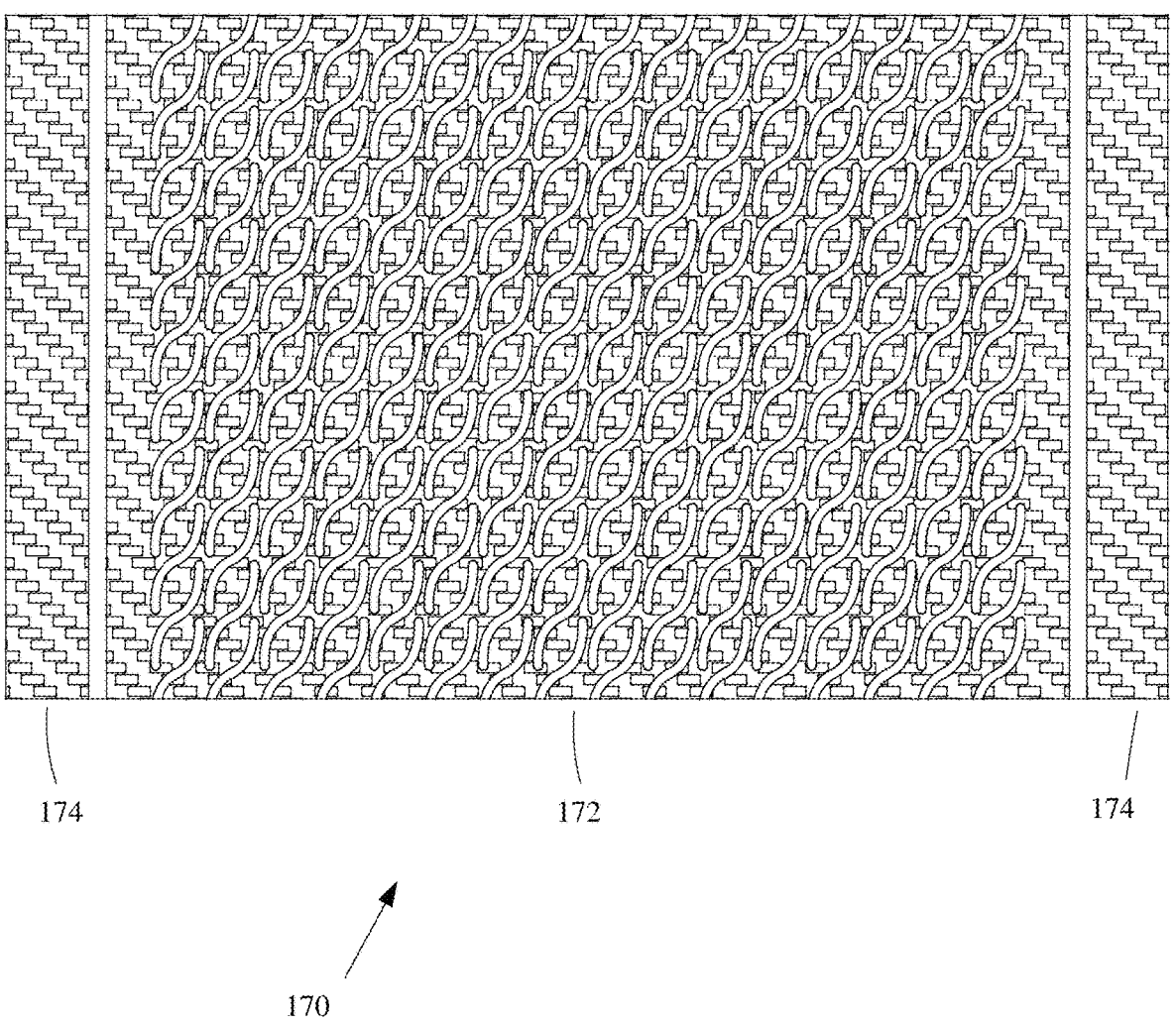
FIG. 7 is a view of an exemplary grip material on the float top surface that prevents a user from slipping.

In an additional embodiment, as illustrated in FIGS. 6A, 6B, 7 at least the top surface or deck 220 of both of the floats 200 are coated with a non-skid pattern material 170 to prevent a user from slipping while walking on the float. FIG. 7 illustrates an exemplary material comprising interwoven S-shapes 172, about 0.68 inches long, 0.39 inches wide, x 0.04 inches tall. The entire strip is about 6 inches wide. In an additional embodiment, the non-skid pattern material 170 further comprises opposing elevated side borders 174 of about 0.75 inches wide for additional prevention of user slippage; and elevated in height (e.g. about 0.04 inches tall).

In another embodiment, non-skid pattern material 170 covers the entire top and side surface of the float. In another embodiment, the non-skid pattern material 170 covers the entire exterior surface of the float surface 210.

Methods of Installation

A method of installing a seaplane float frame apparatus on an airplane, comprises the steps of: 1) providing a seaplane float frame apparatus 100 as disclosed herein; 2) affixing the float frame middle section 110 to the underside of an airplane fuselage 500; and 3) affixing a float to a bottom flat edge 138 on each of the two opposing side panels 130 of the float frame 100. In an embodiment, the seaplane normal landing gear is removed before affixing the middle section 110 to the airplane fuselage 500. In another embodiment, an emergency extension land gear system is installed around the float frame apparatus 300.

FIG. 5 illustrates the mechanism of attaching the seaplane fuselage 500 to the top of the float frame 100. In an exemplary embodiment, bolts 150 comprising ⅜ inch bolts are used at the front and middle connection of float middle section 110, and blots 152 comprising 5/16 inch bolts are used at the rear section of 110. Other types of mechanisms to attach the fuselage 500 to the float frame 100 are well known in the art, and thus envisioned within the scope of the present invention.

FIGS. 6A, 6B illustrate mechanisms to securely attach the bottom of the float frame 100 to the floats 200. The two opposing side panels 130 further comprise a bottom flat edge 138 and a mechanical unit 180 comprising bolts and plates to securely attach the top of a float 200 to a side panel 130. Other types of mechanisms to securely attach the bottom edge 138 of the float frame 100 to a float 200 are well known in the art, and thus envisioned within the scope of the present invention, such as affixing horizontal bars 232, 234 to connect the two floats 200 together, or to connect the two opposing frame sides 130 (aka-pontoon interface) and the two floats 200 together as one unit.

Float System and Method of Use

Figure 1C:
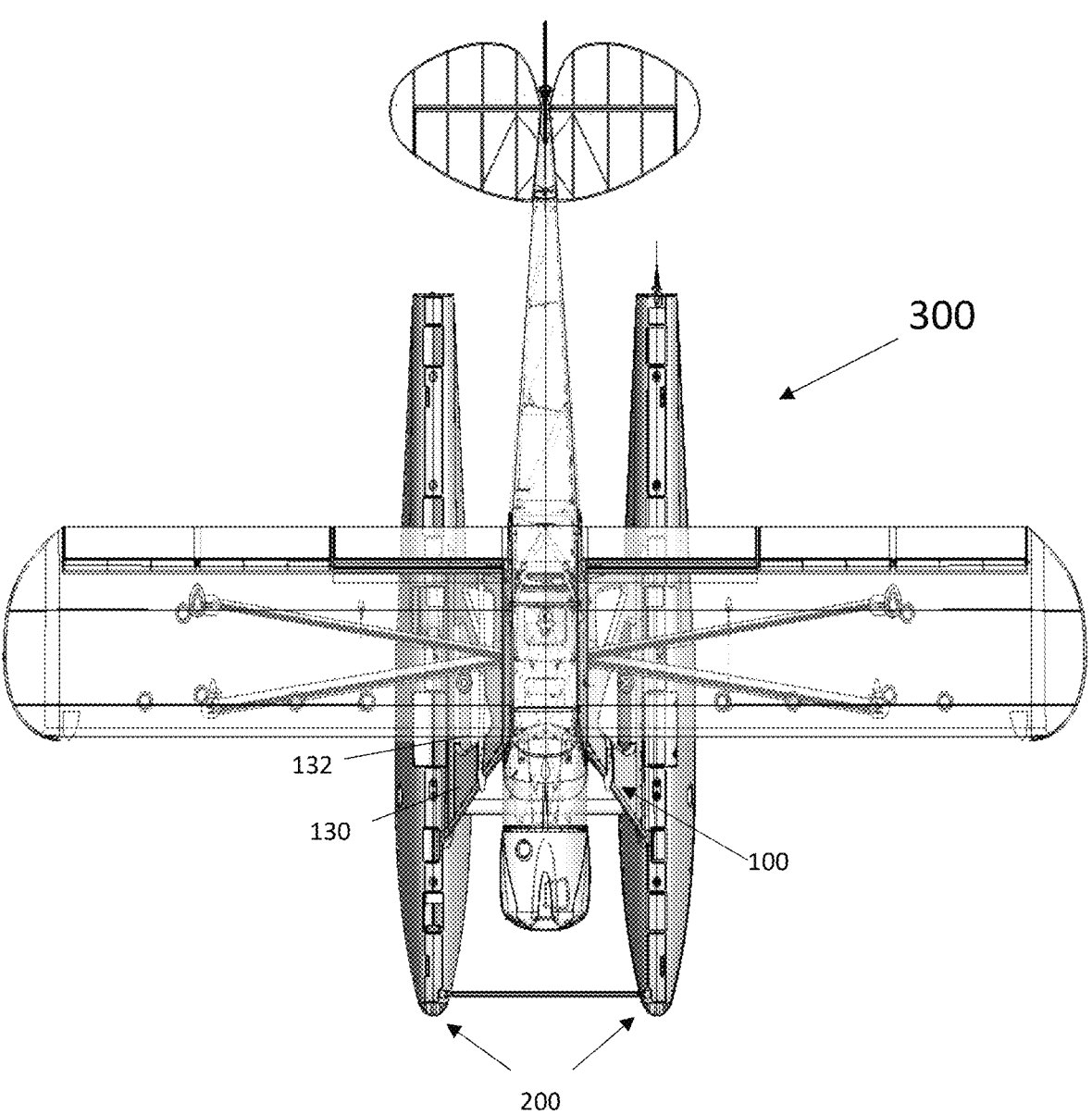
FIG. 1C is a top plan view of another embodiment of the seaplane of without retractable wheels on the float.

The float system 300 of the present invention comprises the float frame apparatus 100 attached to a pair of seaplane floats 200, such as those floats widely known in the industry or a novel float system as disclosed herein (e.g. coated with non-skid/slip material). Exemplary floats for use in the float system 300 are illustrated in FIGS. 1A-1C (retractable wheeled floats), and FIGS. 6A, 6B (non-wheeled floats). In an embodiment, floats 200 in the float system 300 of the present invention comprise: a substantially oval shape 210 (pointed front/back tips and a wide mid-section); a top deck 220 (e.g. relatively flat); a rear rudder 230 (optional). Floats 200 may further comprise: a plurality of compartments within each float (e.g. 4-6); a mechanism to remove water from within the float compartments (e.g. pumps); an optional front wheel (FIGS. 1A-1C, 160) that is retractable and extendable, e.g. from within the cockpit; and an optional retractable main wheel 162 that rotates into a cavity in the float bottom.

Seaplanes and floats for use in the present invention must be in accordance with the current 14 Code Federal Regulation (CFR) § 23.2310 *Buoyancy for seaplanes and amphibians*, which presently states that airplanes intended for operations on water, must: (a) provide buoyancy of 80 percent in excess of the buoyancy required to support the maximum weight of the airplane in fresh water; and (b) have sufficient margin so the airplane will stay afloat at rest in calm water without capsizing in case of a likely float or hull flooding. To be certified, the floats must be able to handle applicable structural design loads. (14 CFR 23.2230 Limit and ultimate loads). The manufacturer determines the structural design loads resulting from taxi, takeoff, landing, and handling conditions on the applicable surface in normal and adverse attitudes and configurations. (14 CFR 23.2220 Ground and water load conditions). Displacement is the volume or weight of the water displaced by the float. Part of the float number often refers to the displacement. For example, in float EDO 696-3500, the "3500" refers to the displacement of 3500 lbs.

Floats widely known in the industry for use in the float system 300 of the present invention are those that are popular additions on airplanes, such as the Cessna 185, Aviat Husky, American Champion Scout, and de Havilland Beaver and Twin Otter. Most floats are constructed from either aluminum or composite materials, which make them lightweight and easy to repair.

In a particular embodiment of the present invention, the floats 200 for use in the float system 300 are novel structural designs (e.g., non-slip material-FIG. 7, horizontal bars affixing floats together and to the float frame 100-FIGS. 6A, 130, etc.), and are made of a carbon composite.

In an embodiment, the interior of a seaplane float 200 is not completely hollow; but rather is engineered with separate watertight compartments (e.g. 4-6 compartments) that prevent the float from filling up with water if it gets punctured. In an embodiment, the floats comprise pumps in one or more, e.g. at the top of each compartment, to drain out the water from the floats during preflight, as water can add weight and impact the aircraft's center of gravity.

CONCLUSION

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Further, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow.

In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

As used herein, the term "substantially" refers to a shape similar to the one stated.

As used herein, the term "about" refers to plus/minus 1-5 percent of the stated value. In an embodiment, about is plus/minus 5% of the stated value.

Trademarks are the property of their owners.

What is claimed is:

1. A float frame configured to operably couple two floats to an underside of a fuselage of a seaplane for enabling water landing and takeoff maneuvers, the float frame comprising:
   a central frame section configured to operably couple to the underside of the seaplane fuselage, the central frame section having a first lateral edge portion and a second lateral edge portion opposite the first lateral edge portion;
   at least one auxiliary fuel storage tank contained within the central frame section and positioned laterally between the first and second lateral edge portions; and
   a first side frame panel extending outwardly from the first lateral edge portion and a second side frame panel extending outwardly from the second lateral edge portion, the first and second side frame panels angled downward from a horizontal plane extending through the first and second lateral edge portions, wherein each of the first and second side frame panels have an end portion positioned opposite the respective first and second lateral edge portions of the central frame section, wherein each of the end portions of the first and second side frame panels is configured to couple one of the two floats to the float frame,
   wherein the at least one auxiliary fuel storage tank is configured to provide fuel to the seaplane in flight.

2. The float frame of claim 1, wherein the first and second side frame panels are angled downward from the horizontal plane at about 45° to about 60°.

3. The float frame of claim 1, wherein the first and second side frame panels each further comprise one or more cutouts configured to reduce weight and drag of the float frame.

4. The float frame of claim 3, wherein the cutouts comprise two right triangles in each of the first and second side frame panels.

5. The float frame of claim 1, further comprising a step protruding outwardly from each of the first and second side frame panels to assist a user climbing into/out of the seaplane.

6. The float frame of claim 1, wherein the central frame section further comprises a fuel pump and a fuel line fluidly coupling the fuel pump to the at least one auxiliary fuel storage tank, wherein the fuel pump is configured to pump fuel from the at least one auxiliary fuel storage tank to a main fuel tank or to an engine of the seaplane.

7. The float frame of claim 6, wherein the fuel pump is configured to automatedly pump fuel from the at least one auxiliary fuel tank when the main fuel tank of the seaplane reaches a minimum level of fuel.

8. The float frame of claim 6, wherein the fuel pump is configured to be manually activated by a pilot to pump fuel from the at least one auxiliary fuel tank to the main fuel tank or to the engine of the seaplane.

9. The float frame of claim 6, further comprising a vent line operably coupled to the least one auxiliary fuel storage tank, wherein the vent line is configured to release excess gas pressure and/or fuel from the least one auxiliary fuel storage tank.

10. The float frame of claim 1, wherein the central frame section further comprises an adapter to couple the float frame to the fuselage with fasteners.

11. The float frame of claim 1, wherein the end portions of the first and second side frame panels each comprise a mechanical mounting unit to couple the float thereto with fasteners.

12. The float frame of claim 1, wherein the central frame section and the first and second side frame panels together comprise a saddle shape curved downward with a curved front side and a straight back side in plan view.

13. A seaplane float system configured to operably couple to an underside of a fuselage of a seaplane for enabling water landing and takeoff maneuvers, the seaplane float system comprising:
   a float frame, comprising:
      a central frame section configured to operably couple to the underside of the seaplane fuselage, the central frame section having a first lateral edge portion and a second lateral edge portion opposite the first lateral edge portion;
      at least one auxiliary fuel storage tank contained within the central frame section and positioned laterally between the first and second lateral edge portions; and
      first and second side frame panels extending outwardly from the first and second lateral edge portions, respectively, of the central frame section, the first and second side frame panels angled downward from a horizontal plane extending through the first and second lateral edge portions;
   a first float coupled to an end portion of the first side frame panel positioned opposite the first lateral edge portion of the central frame section; and
   a second float coupled to an end portion of the second side frame panel positioned opposite the second lateral edge portion of the central frame section,
   wherein the at least one auxiliary fuel storage tank is configured to provide fuel to the seaplane in flight.

14. The seaplane float system of claim 13, wherein the first and second side frame panels are angled downward from the horizontal plane at about 45° to about 60°.

15. The seaplane float system of claim 13, wherein the central frame section further comprises a fuel pump and a fuel line fluidly coupling the fuel pump to the at least one auxiliary fuel storage tank, wherein the fuel pump is configured to automatically pump fuel from the at least one auxiliary fuel storage tank to a main fuel tank or to an engine of the seaplane when the main fuel tank of the seaplane reaches a minimum level of fuel.

16. The seaplane float system of claim 13, wherein the float frame and/or the first and second floats comprise a light-weight carbon composite.

17. The seaplane float system of claim 13, wherein each of the first and second floats comprise a non-skid pattern material on at least a top deck surface of the first and second floats to prevent a user from slipping while walking on the floats.

18. The seaplane float system of claim 17, wherein the non-skid pattern material comprises an interwoven S-pattern.

19. The seaplane float system of claim 17, wherein the non-skid pattern material is about 6 inches wide with two opposing elevated side borders about 0.75 inches thick.

20. The seaplane float system of claim 13, wherein each of the first and second floats further comprise a retractable wheel set having a nose wheel and a main wheel.

\*   \*   \*   \*   \*